United States Patent
Pilkauskas et al.

(10) Patent No.: US 11,489,937 B2
(45) Date of Patent: *Nov. 1, 2022

(54) METHODS AND SYSTEMS FOR IMPLEMENTING A REGIONALLY CONTIGUOUS PROXY SERVICE

(71) Applicant: TESO LT, UAB, Vilnius (LT)

(72) Inventors: Valdas Pilkauskas, Vilnius (LT); Karolis Dzekunskas, Vilnius (LT)

(73) Assignee: TESO LT, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,213

(22) Filed: May 26, 2022

(65) Prior Publication Data

US 2022/0303357 A1    Sep. 22, 2022

Related U.S. Application Data

(63) Continuation of application No. 17/455,256, filed on Nov. 17, 2021, now Pat. No. 11,381,667, which is a
(Continued)

(51) Int. Cl.
*G06F 15/16* (2006.01)
*H04L 67/561* (2022.01)
(Continued)

(52) U.S. Cl.
CPC ........ *H04L 67/561* (2022.05); *H04L 43/0852* (2013.01); *H04L 61/4511* (2022.05);
(Continued)

(58) Field of Classification Search
CPC ....... H04L 67/561; H04L 67/01; H04L 67/52; H04L 61/4511; H04L 43/0852; H04L 67/306
(Continued)

(56) References Cited

U.S. PATENT DOCUMENTS

| 8,612,564 | B2 | 12/2013 | Swildens et al. |
| 8,793,397 | B2 | 7/2014 | Chan et al. |
| 9,154,557 | B2 | 10/2015 | Lev-Ran et al. |
| 10,257,319 | B2 | 4/2019 | Shribman et al. |

(Continued)

FOREIGN PATENT DOCUMENTS

WO    2019043687 A2    3/2019

OTHER PUBLICATIONS

PCT Written Opinion of the International Searching Authority, PCT/ISA/237, dated Jan. 27, 2022, 12 Pages.

*Primary Examiner* — Alan S Chou
(74) *Attorney, Agent, or Firm* — FisherBroyles, LLP; Keats Quinalty

(57) ABSTRACT

System and method for efficiently implementing scalable, highly efficient decentralized proxy services through proxy infrastructures situated in different geo-locations. In one aspect, the systems and methods enable users from any geographical location to send requests to the geographically closest proxy infrastructure. One exemplary method described allows proxy infrastructures to gather, classify, and store metadata of exit nodes in its internal database. In another aspect, systems and methods described herein enable proxy infrastructures to select metadata of exit nodes from its internal database and forward requests from a user device to respective proxy servers or proxy supernodes to which the selected exit nodes are connected.

23 Claims, 10 Drawing Sheets

Related U.S. Application Data continuation of application No. 17/207,198, filed on Mar. 19, 2021, now Pat. No. 11,212,354.

(51) Int. Cl.
*H04L 67/01* (2022.01)
*H04L 67/52* (2022.01)
*H04L 67/306* (2022.01)
*H04L 61/4511* (2022.01)
*H04L 43/0852* (2022.01)

(52) U.S. Cl.
CPC ............ *H04L 67/01* (2022.05); *H04L 67/306* (2013.01); *H04L 67/52* (2022.05)

(58) Field of Classification Search
USPC .......................................................... 709/227
See application file for complete search history.

(56) References Cited

U.S. PATENT DOCUMENTS

| | | | |
|---|---|---|---|
| 10,484,510 B2 | 11/2019 | Shribman et al. | |
| 10,491,712 B2 | 11/2019 | Shribman et al. | |
| 10,581,904 B2 | 3/2020 | Holloway et al. | |
| 10,873,647 B1* | 12/2020 | Pilkauskas | H04L 43/50 |
| 11,044,342 B2 | 6/2021 | Shribman et al. | |
| 11,044,344 B2 | 6/2021 | Shribman et al. | |
| 11,212,354 B1* | 12/2021 | Pilkauskas | H04L 67/563 |
| 2003/0149720 A1 | 8/2003 | Goldstein | |
| 2006/0206586 A1 | 9/2006 | Ling et al. | |
| 2008/0091812 A1 | 4/2008 | Lev-Ran et al. | |
| 2014/0122580 A1 | 5/2014 | Nuaimi et al. | |
| 2015/0074244 A1 | 3/2015 | Lewis et al. | |
| 2015/0195354 A1 | 7/2015 | Lyon | |
| 2019/0222536 A1* | 7/2019 | Murashko | H04L 67/63 |
| 2021/0014236 A1 | 1/2021 | Turgeman et al. | |
| 2021/0119918 A1 | 4/2021 | Munson et al. | |

* cited by examiner

METHODS AND SYSTEMS FOR IMPLEMENTING A REGIONALLY CONTIGUOUS PROXY SERVICE

CROSS-REFERENCE TO RELATED APPLICATIONS

This application is a continuation of U.S. patent application Ser. No. 17/455,256, filed Nov. 17, 2021, which is a continuation of U.S. patent application Ser. No. 17/207,198, filed Mar. 19, 2021, which issued as U.S. Pat. No. 11,212,354 on Dec. 28, 2021, each of which are incorporated herein by reference in their entirety.

FIELD

The present embodiments generally relate to methods and systems for optimizing proxy services' operational process by establishing proxy servers across diverse geographical territories, which, among other aspects, decentralizes and reduces remoteness when users approach proxy services for data retrieval.

BACKGROUND

As our society relies increasingly on the Internet and as many entrepreneurs conduct their businesses online, interest in proxy servers has increased significantly. Modern Proxy servers provide several functionalities to their users apart from online anonymity.

By definition, proxy servers are intermediary servers that accept users' requests and forward the requests to other proxy servers, a source server, or service the request from their cache. In simple terms, a proxy server acts as a gateway between the user's device and the website they want to access. Proxy servers change the user's IP address so that the actual IP address of the user is not revealed to the destination server. In networking terms, IP address stands for Internet Protocol address which is a numerical label assigned to each device connected to a network that uses the Internet Protocol for communication. In a more general sense, an IP address functions as an online address because devices use IPs to locate and communicate with each other. Using a proxy server increases privacy and allows users to access websites that might not normally be accessed. Proxy servers are easy to use, and many multinational enterprises also prefer them for their online working.

Many organizations employ proxy servers to maintain a better network performance. Proxy servers can cache common web resources—so when a user requests a particular web resource, the proxy server will check to see if it has the most recent copy of the web resource, and then sends the user the cached copy. This can help reduce latency and improve overall network performance to a certain extent. Here, latency refers specifically to delays that take place within a network. In simpler terms, latency is the time between user action and the website's response or application to that action—for instance, the delay between when a user clicks a link to a webpage and when the browser displays that webpage.

Proxies can be divided into different types depending on what functions are provided or what servers are used. Proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi.

Likewise, exit node proxies, or simply exit nodes, are proxies, and through these proxies the request from the user (or the entry node) reaches the Internet. There can be several proxies used to perform a user's request, but exit node proxy is the final proxy that contacts the target and forwards the information from the target to the queue to reach the user. In the current embodiments proxies and exit nodes can be used as synonyms. The current embodiments are not limited only to the exit nodes as the same technologies can be used for the proxies. However, the term exit node is employed in the current description to clarify the technical differences between exit nodes and proxies. Typically, the exit node device is external to the proxy service provider infrastructure, usually belonging to a private customer e.g. a smartphone, a computer, a TV, or an other Internet-enabled electronic device.

Modern proxy servers do much more than simply forwarding web requests. Proxy servers act as a firewall and web filter, provide shared network connections, and cache data to speed up common requests. Proxy servers can provide a high level of privacy. Proxy servers can also be used to control internet usage of employees and children (e.g., organizations and parents set up proxy servers to control and monitor how their employees or kids use the Internet) or improve browsing speeds and save the bandwidth. Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example a US webpage, but they do not have access from their home country, they can make the request through a proxy server that is located in the USA (and has a US IP address). Using proxy services, the user's traffic seems to be coming from the USA IP address. Proxies can also be used for web scraping, data mining, and other similar tasks.

Classifications of proxy servers are also done based on protocols on which a particular proxy may operate. For instance, HTTP proxies, SOCKS proxies and FTP proxies are some of the protocol-based proxy categories. The term HTTP stands for Hypertext Transfer Protocol, the foundation for any data exchange on the Internet. Over the years, HTTP has evolved and extended, making it an inseparable part of the Internet. HTTP allows file transfers over the Internet and, in essence, initiates the communication between a client/user and a server. HTTP remains a crucial aspect of the World Wide Web because HTTP enables the transfer of audio, video, images, and other files over the Internet. HTTP is a widely adopted protocol currently available in two different versions—HTTP/2 and the latest one—HTTP/3.

HTTP proxy can act as a high-performance proxy content filter. Similar to other proxies, HTTP proxy works as an intermediary between the client browser and the destination web server. HTTP proxy can save much bandwidth through web traffic compression, caching of files and web pages from the Internet. Here, bandwidth refers to the amount of data that can be transferred from one point to another within a network in a specific amount of time. Typically, bandwidth is expressed as a bitrate and measured in bits per second (bps). HTTP proxy is a feasible option for companies that need to access ad-heavy websites. Furthermore, HTTP proxies allow many users to utilize the connection concurrently, making HTTP proxies useful for companies with a large number of employees. In short, HTTP proxies can be understood as an HTTP tunnel, i.e., a network link between devices with restricted network access.

Likewise, SOCKS refers to an Internet protocol that allows one device to send data to another device through a third device. In other words, this device would be called a SOCKS server or a SOCKS proxy. Specifically, a SOCKS proxy creates a connection to any other server that stands behind a firewall, and exchanges network packets between the client and the actual server. SOCKS proxies are usually needed where a TCP connection is prohibited, and data can be reached only through UDP. SOCKS proxies are a tool that allows for a specific way to connect to the Internet. SOCKS is the latest version of the SOCKS protocol. The difference between SOCKS5 and older versions of it is its improved security and the ability to support UDP traffic.

SOCKS proxies are often used for live calls or streaming. Streaming websites commonly use UDP to send data and currently, SOCKS is the main type of proxies that can handle a UDP session. In order to use a SOCKS proxy, the user's device must have the capability to handle SOCKS protocol and must be able to operate and maintain a SOCKS proxy server. The main problem with SOCKS proxies is that the protocol does not have standard tunnel encryption. Since the SOCKS request carries data in cleartext, SOCKS proxies are not recommended for situations where "sniffing" is likely to occur.

Similar to HTTP and SOCKS, the term FTP refers to one of the protocols used to move files on the Internet. The term FTP stands for File Transfer Protocol. In FTP, a control connection is used to send commands between an FTP client and an FTP server. However, the file transfers occur on a separate connection called the data connection. The FTP proxy can offer enhanced security for uploading files to another server. Moreover, the FTP proxy typically offers a cache function and encryption method, making the transmission process secure and safe from hackers. In addition to relaying traffic in a safe environment, an FTP server keeps track of all FTP traffic.

It would be appropriate here to elucidate on how network devices exchange data using Internet Protocols. When a user connects to the Internet, the user establishes a connection with a web server in a few simple steps, whether the user uses wired or wireless technology. This network communication is made possible by a set of protocols known as the Internet Protocol Suite. One of the most important protocols in the suite is the Transmission Control Protocol (TCP). It determines how network devices exchange data. The Transmission Control Protocol or TCP is a standard for exchanging data between different devices in a computer network.

Over the years, several improvements and extensions have been made, although the protocol's core structure remains unchanged. The current version of the TCP allows two endpoints in a shared computer network to establish a connection that enables a two-way transmission of data. Any data loss is detected and automatically corrected; thus, TCP is considered a reliable protocol. TCP protocol is almost always based on the Internet Protocol (IP), and this connection is the foundation for the majority of public and local networks and network services.

As mentioned earlier, TCP allows the transmission of information in both directions. Computer systems that communicate over TCP can send and receive data simultaneously, similar to a telephone conversation. The protocol uses segments (packets) as the basic units of data transmission. In addition to the payload, segments can also contain control information and are limited to 1500 bytes. Here, payload refers to the actual data that is being transferred. Moreover, byte refers to the basic unit of information in computer storage and processing. Further, a byte consists of 8 adjacent binary digits (bits), each of which consists of a 0 or 1. Overall, TCP is responsible for establishing and terminating the end-to-end connections as well as transferring data.

TCP is utilized widely by many Internet applications, including the World Wide Web (WWW), email, streaming media, peer-to-peer file sharing. Due to network congestion, or unpredictable network behaviour, IP packets may be lost, duplicated, or delivered out of order. TCP detects these problems, requests retransmission of lost data, rearranges out-of-order data, and even helps minimize network congestion. If data remains undelivered, the source is notified of this failure. Once the TCP receiver has reassembled the sequence of data packets originally transmitted, the packets are then passed to the receiving application. TCP is optimized for accurate delivery rather than timely delivery and can incur relatively long delays (on the order of seconds) while waiting for out-of-order messages or re-transmissions of lost messages. Finally, TCP is a reliable stream delivery service which guarantees that all bytes received will be identical and in the same order as those sent. Since packet transfer by many networks is not reliable, TCP achieves this using a technique known as positive acknowledgement with retransmission.

A TCP packet is a complex construct, wherein TCP protocol incorporates multiple mechanisms to ensure connection state, reliability, and flow control of data packets: a) Streams: TCP data is organized as a stream of bytes, much like a file. b) Reliable delivery: Sequence numbers are used to coordinate which data has been transmitted and received. TCP will arrange for retransmission if it determines that data has been lost. c) Network adaptation: TCP will dynamically learn the delay characteristics of a network and adjust its operation to maximize throughput without overloading the network. d) Flow control: TCP manages data buffers and coordinates traffic so its buffers will never overflow. Fast senders will be stopped periodically to keep up with slower receivers. e) Round-trip time estimation: TCP continuously monitors the exchange of data packets, develops an estimate of how long it should take to receive an acknowledgement, and automatically retransmits if this time is exceeded.

Initializing the connection the two endpoints mutually establish multiple operational parameters defining how the participants exchange data, control the state of connection, mitigate quality issues, signal each other when changes in the session management are needed. To achieve this TCP connection utilizes several methods, e.g. TCP flags, or 1-bit boolean fields, in TCP packets' header. Flags are used to indicate a particular state of a connection or provide some additional useful information like troubleshooting purposes or controlling a particular connection. There are several most common flags used for managing the state of a TCP session: a) SYN—(Synchronize) Initiates a connection; b) FIN—(Final) Cleanly terminates a connection; c) ACK—Acknowledges received data. There are also other flags that are used in a TCP packet such as RST (Reset), PSH (Push), URG (Urgent). A TCP packet can have multiple flags set. TCP almost always operates in full-duplex mode (two independent byte streams traveling in opposite directions). Only during the start and end of a connection will data be transferred in one direction and not the other.

When the sending TCP host wants to establish a connection, it sends a packet with the SYN flag set to the receiving TCP endpoint. The receiving TCP returns a packet with the flags SYN+ACK set to acknowledge the successful receipt of the segment. The initiator of the communication session then sends another ACK segment and proceeds to send the data. This exchange of control information is referred to as a three-way handshake.

Parameters crucial to effectively communicating between two TCP endpoints are negotiated and established during the 3-way handshake. When the session is well established, some of the parameters are dynamically varied to better adapt to the live network communication session's ever-changing conditions. The ones most relevant to establishing the context for the functionality enhancement achieved by the invention presented are TCP Window Size, Round Trip Timeout (RTT), and Maximum Segment Size (MSS) which are most relevant for understanding the way the enhancement works. Here, RTT or the Round Trip Time Out refers to the total time taken to send the first packet to the destination, plus the time taken to receive the response packet.

The term TCP Window Size, or TCP receiver Window Size (RWND), is simply an advertisement of how much data (in bytes) the receiving device is willing to receive at any point in time i.e. how much data the Sender can send without getting an acknowledgement back. The receiving device can use this value to control the flow of data, or as a flow control mechanism. RWND is first communicated during the session initialization and is dynamically updated to adapt to the state of the connection. Both sides of the connection maintain their own RWND.

Furthermore, TCP has provisions for optional header fields identified by an option kind field. Some options may only be sent when SYN is set and others may surface during the established TCP session. Their function is to set optional parameters for the current TCP session, fine-tuning the protocol's operation. MSS or Maximum Segment Size is the parameter within the 'options' area that defines how much actual data may be transferred within a TCP segment, apart from the technical headers. As mentioned before, MSS establishment happens during the initial 3-way handshake and is the result of both TCP endpoints exchanging their desired MSS and both selecting the smaller one.

To summarize, the function of TCP (Transmission Control Protocol) is to control the transfer of data to be reliable. However, congestion control is one of the critical features of TCP. Network congestion may occur when a sender overflows the network with numerous packets. During network congestion, the network will not be able to handle traffic properly, which will result in a degraded quality of service. Typical symptoms of congestion are excessive packet delay, packet loss and retransmission. TCP congestion control ensures that the sender does not overflow the network. Additionally, TCP congestion control ensures that the network devices along a routing path do not become overflowed. Insufficient link bandwidth, poorly designed or configured network infrastructure are some of the common causes of congestion.

Over the years, there are several algorithms developed to implement TCP congestion control and Bandwidth Bottleneck and Round trip time (BBR) is one such algorithm. Until recently, the Internet has primarily used loss-based congestion control, relying only on indications of lost packets as the signal to slow down the sending rate. However, BBR uses latency, instead of lost packets as a primary factor to determine the sending rate. The main advantage of BBR is better throughput and reduced latency. The throughput improvements are especially noticeable on long routing paths such as the transatlantic transmission. The improved latency is mostly experienced on the last mile path. Here, the term last mile path refers to the final leg of the telecommunication network.

Bandwidth Bottleneck Round trip time (BBR) algorithm uses the maximum bandwidth and round-trip time at which the network delivered the most recent set of outbound data packets to develop a model of the network. Each cumulative or selective acknowledgment of packet delivery produces a rate sample which records the amount of data delivered over the time interval between the transmission of a data packet and the acknowledgment of that packet.

As network interface controllers evolve from megabit per second to gigabit per second performance, the latency associated with bufferbloat instead of packet loss becomes a more reliable marker of the maximum throughput, making model-based congestion control algorithm such as BBR, a more reliable alternative to more popular loss-based algorithms. In a shared network, bufferbloat is a phenomenon whereby buffering of packets causes high latency and jitter, as well as reducing the overall network throughput.

In a TCP data transmission, BBR algorithm calculates a continuous estimate of RTT and the bottleneck capacity. The RTT is the minimum of all RTT measurements over some time window, described as "tens of seconds to minutes". The bottleneck capacity is the maximum data delivery rate to the receiver. These estimated values of RTT and bottleneck capacity are independently managed, in that either can change without necessarily impacting the other. Further on, for every sent packet, BBR marks whether the data packet is part of a transmission flow or whether the transmission flow has paused, in which case the data is marked as "application limited". Moreover, the packets to be sent are paced at the estimated bottleneck rate, intended to avoid network queuing that would otherwise be encountered when the network performs rate adaption at the bottleneck point. In short, BBR ensures that the sender is passing packets into the network at a rate that is anticipated not to encounter queuing within the entire path.

Apart from transport protocols, DNS is another essential part of the Internet infrastructure. DNS is an acronym for Domain Name Services and is a standard protocol enabling the internet user to be directed to the target resource. Resolving domain names into numerical IP addresses is vital for locating and identifying target websites, servers, or devices along with underlying network protocols.

DNS resolving is carried out by a DNS resolver also known as a recursive resolver, which is a server designed to receive DNS queries from web browsers and other applications. A DNS query or a DNS request is a demand for information sent from a user's device to a DNS server, in most cases DNS request is sent in order to ask for the IP address associated with a domain name. The resolver receives the domain name and directs it to the root server and receives the details of Top-Level Domain name (TLD) server. Through the TLD name server, the root server receives the details of an authoritative name server and requests for IP addresses that match the desired domain name, the DNS query is resolved when it receives the requested IP address. Nevertheless, DNS servers can be configured to redirect the user queries (requests) to a proxy server that represents the actual target server. This is done by replacing actual IP addresses of target servers for the IP addresses of the proxy server. These are usually carried out by proxy service providers to enhance their services and improve security. Apart from configuring the DNS servers, firewalls can also be used to reroute the user request and redirect them to a proxy server. An alternative DNS service is the anycast DNS, which is a traffic routing method used for the speedy delivery of website content that advertises individual IP addresses on multiple nodes. User requests are directed to specific nodes based on such factors as the capacity and health of your server, as well as the distance between it and the website visitor.

Diverging back to proxy servers would be befitting here to elucidate further one of the use cases of proxy servers. Proxies can be extremely useful in the process of data gathering/harvesting. Web data gathering/harvesting is also referred to as web scraping. Since web scraping is usually carried out by automated applications (known as web scraper or web crawler), web scraping can be easily detected and blocked by many standard websites. However, if web scrapers employ proxy services, web scraping activities could be easily masked so that the probability of being banned from websites is significantly reduced. Also, web scrapers and web crawlers can use proxies to bypass geo-restrictions and access data irrespective of their geographical locations.

A proxy provider can control the quality of proxies and choose the end proxies to reach a target web resource on behalf of the client. If the same proxy is used for too many requests, the proxy may be banned by the Internet service provider or the web page, and it will not be possible to use such a proxy to make subsequent requests. If too many requests come in from one IP address in a short period, then the web server may return an error message and possibly disallow the requests from that proxy for a pre-set period of time. In order to prevent errors or disallowed requests, proxies are checked from time to time by the service provider, and corrupted proxies are removed from the proxy pool (such proxies are not provided to the client anymore). The service provider can check proxies on several different grounds: if the proxy is online, what is the delay time, what Internet connection proxy uses (Wi-Fi, mobile data, etc.). The examination of a proxy is performed in scheduled time intervals to ensure that the users can efficiently use a particular proxy using the proxy services.

However, there are significant challenges that are associated with proxies and proxy services in general. Moreover, not every proxy provider can offer users reliable and efficient proxy services. Network problems such as latency and low network throughput are the main challenges that every proxy provider faces. In networking terms, latency is a measure of delay. Latency is usually measured as a round trip delay—the time taken for information to get to its destination and back again. Likewise, the term network throughput points out to the amount of data transferred from a source at any given time. Network congestion is the key contributing factor for low throughput levels.

Higher latency is a direct result of significant geographical distance and the number of "hops" between servers and users. Hop in networking terms refers to the number of network interfaces that a packet (a portion of data) passes through from its source to its destination. An important cause for latency in proxy services is geographical remoteness. The locations users choose can significantly affect a proxy's speed in processing users' requests. Optimum locations are the ones that are closer to users and also close to the target site. The distance between the user and the proxy provider's central infrastructure can also contribute to latency. For instance, if a particular proxy provider lacks presence in a user's region e.g. through a globally distributed infrastructure, the user will likely suffer significant latency. A right choice of locations can help minimize latency. Therefore, latency could be significantly reduced by choosing a proxy in close proximity to the user and the target.

Among other aspects, the current embodiments provide means for globally spread-out infrastructures that benefit proxy providers and users in bringing down latency and increasing network throughput. The presently described embodiments in other aspects also increase the success rate of data gathering and extraction from the network.

SUMMARY

Several aspects described herein are aimed at methods and systems relating to proxy service providers which may combine multiple computing components into scalable, highly efficient and globally distributed infrastructures, which, for instance, can provide means to improve latency and network performance for users approaching the proxy services.

To improve the quality of proxy services, a solution to allow users to send proxy requests to one of the geographically closest proxy infrastructures to reduce latency and improve network performance. The proposed solution, in one aspect, provides systems and methods to identify and select metadata of exit nodes situated in geographical proximity to the proxy infrastructures to serve the user requests. Further, the proxy infrastructures directly forward the user requests to respective proxy supernodes to which the selected exit nodes are connected. In another aspect, the proxy supernodes can select and identify metadata of exit nodes situated in a specific geo-location requested by the users. Moreover, proxy infrastructure can directly forward the user requests to respective proxy supernodes to which the selected exit nodes are connected. It is important to mention here that proxy infrastructure selects metadata of exit nodes from its internal database. Selecting the metadata of exit nodes and forwarding the user requests to respective proxy supernodes from proxy infrastructures geographically closest to users can significantly reduce the number of hops and decrease latency. The solution also provides methods and systems to test, gather regularly, and store multiple exit nodes' metadata.

DETAILED DESCRIPTION

Figure 1:
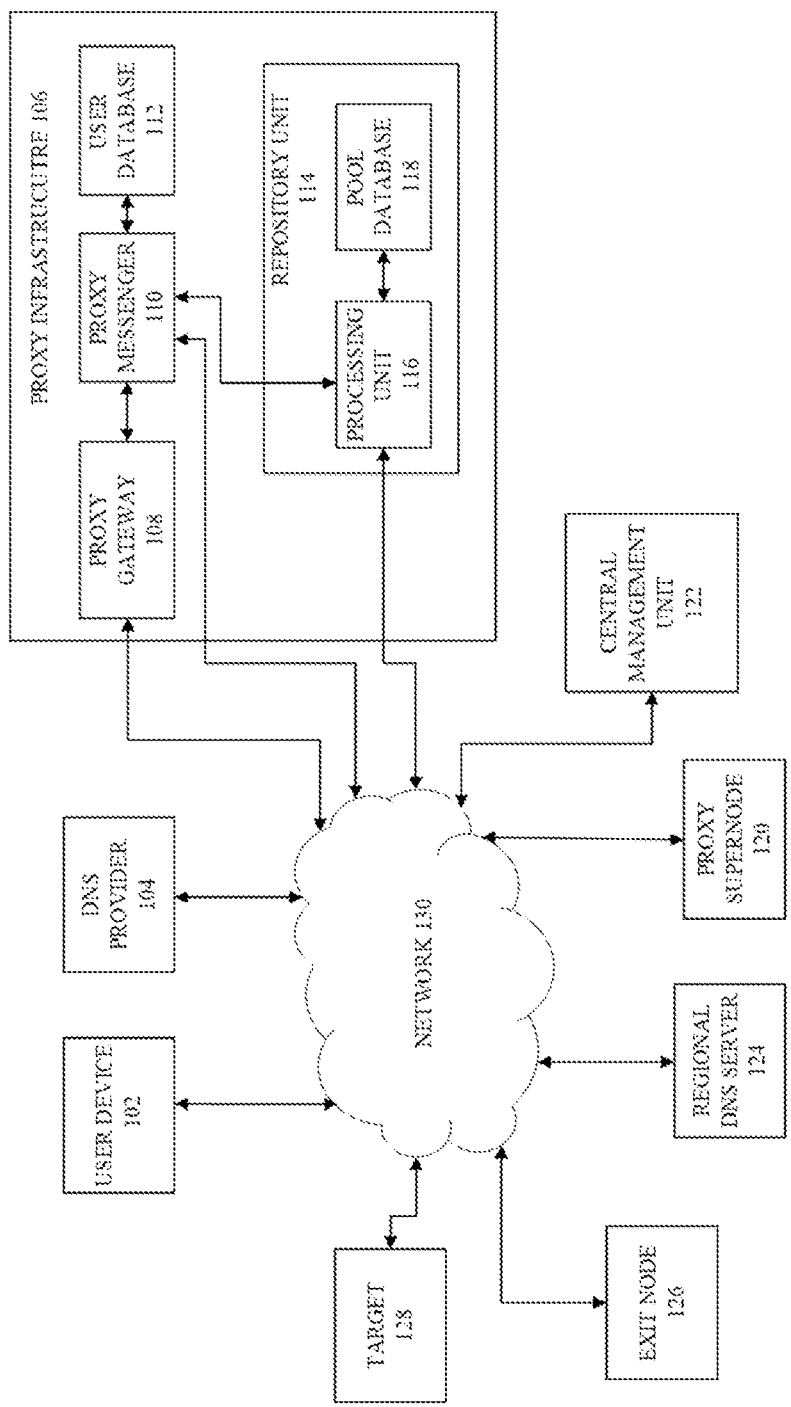
FIG. 1 shows a block diagram of an exemplary architectural depiction of components.

Some general terminology descriptions may be helpful and are included herein for convenience and are intended to be interpreted in the broadest possible interpretation. Elements that are not imperatively defined in the description should have the meaning as would be understood by the person skilled in the art.

User Device 102—can be any suitable computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for connecting to a proxy server. Additionally, it should be noted that the term "user'" is being used in the interest of brevity and may refer to any of a variety of entities that may be associated with a subscriber account such as, for example, a person, an organization, an organizational role within an organization, a group within an organization, requesting and using proxy services to obtain relevant, information from the web (e.g., scraping, streaming, etc.).

DNS Provider 104—a party providing DNS services, a combination of hardware and software, enabled to resolve domain name queries made by User Device 102. DNS Provider 104 can also be located on a cloud or a third-party provider. DNS service is the process of translating domain names to the respective IP addresses. It is important to note that DNS Provider 104 responds to DNS queries based on the geographical location of both the User Device 102 and the Proxy Gateway 108 to which the User Device 104 is attempting to connect. DNS Provider 104 resolves DNS queries by providing the IP address of the Proxy Gateway 108 closest to the User Device 102, present within the same geographical territory.

Proxy Infrastructure 106—a proxy server containing Proxy Gateway 108, Proxy Messenger 110, User Database 112, Repository Unit 114 which in turn contains Processing Unit 116 and Pool Database 118. There can be multiple instances of Proxy Infrastructures 106 situated in various geo-locations across the globe.

Proxy Gateway 108—a proxy, a gateway that provides User Device 102 or multiple User Devices 102 access to the proxy services by providing an interface into the Proxy Provider Network 106. Proxy Gateway 108 can be a combination of software and hardware and may include cache services. Proxy Gateway 108 provides an entry point for the User Device 102 into the Proxy Infrastructure 106. Proxy Gateway 108 handles receiving and forwarding the requests and sending back the responses to User Device 102 via Network 130. Proxy Gateway 108 is a constituent of the Proxy Infrastructure 106.

Proxy Messenger 110—a proxy server (a computer system or systems or applications) and a constituent of the Proxy Infrastructure 106 capable of performing several complex functions. Proxy Messenger 110 receives User Devices' 102 requests from Proxy Gateway 108 and checks the requests for any user-defined preferences for exit node selection. Proxy Messenger 110 is responsible for requesting metadata of an exit node or exit nodes that satisfy the user-defined preferences from Repository Unit 114. Moreover, Proxy Messenger can receive metadata of the selected exit node or exit nodes from Repository Unit 114. Proxy Messenger 110 is also responsible for sending User Devices' 102 requests to the respective Proxy Supernode 120 to which the selected exit node is connected. Additionally, if the request of the User Device 102 does not contain user-defined preferences for exit note geo-location, then Proxy Messenger 110 requests metadata of exit node or exit nodes that are in geographical proximity with Proxy Infrastructure 106 from the Repository Unit 114. In some embodiments, Proxy Messenger 110 and Proxy Gateway 108 can be co-located as a single element with a different name; however, the overall functions remain unchanged.

User Database 112—a database, structured storage containing verification credentials of User Devices 102. User Database 112 stores data in tables (named columns and multiple rows), where there is information regarding the verification credentials of multiple User Devices 102. Credentials can include but are not limited to usernames, user identifications, passwords, hash identifications, serial numbers, PIN. User Database 112 can be any physical storage device or cloud-based storage. As mentioned above, in some embodiments, User Database 112 and Proxy Messenger 110 can be co-located into a single element; however, the overall functionality is unchanged. User Database 112 is a constituent of Proxy infrastructure 106.

Repository Unit 114—a computing system, a proxy and a constituent of Proxy Infrastructure 106. Repository Unit 114 includes elements configured to gather, classify and store metadata of exit nodes from Central management Unit 122. Moreover, the Repository Unit 114 can respond to the requests from Proxy Messenger 110 by identifying, selecting metadata of exit nodes and sending the metadata of exit nodes to Proxy Messenger 110. Processing Unit 116 and Pool Database 118 are the elements constituting Repository Unit 114.

Processing Unit 116—a computing system and a constituent of Repository Unit 114, responsible for gathering metadata of exit nodes from Central Management Unit 122. Furthermore, Processing Unit 116 can classify the gathered metadata of exit nodes into categories based on attributes of exit nodes (e.g., location, latency, battery life etc.) and store the classified metadata in Pool Database 118. Processing Unit 116 can identify and select metadata of exit nodes from Pool Database 118 that suits the requests received from Proxy Messenger 110. Moreover, Processing Unit 116 responds to requests from Proxy Messenger 110 by fetching the identified metadata of exit nodes from Pool Database 118 and providing the same to Proxy Messenger 110. One must understand that Processing Unit 116 gathers metadata of exit nodes from Central Management Unit 122 dynamically at a regular time interval. Further still, Processing Unit 116 can make continuous amendments to the metadata of exit nodes stored in Pool Database 118.

Pool Database 118—a constituent of Repository Unit 114, a structured storage unit that contains metadata of exit nodes classified into several categories (such as location, latency, battery life etc.). In some embodiments, Pool Database 118 can be constituted within Processing Unit 114 but remains a part of Repository Unit 114, and the overall function is unchanged.

Proxy Supernode 120—an exemplary instance of a proxy responsible for receiving and forwarding requests from Proxy Messenger 110 to exit nodes. Further, Proxy Supernode 120 can receive responses for the aforementioned requests from exit nodes and can forward the responses to Proxy Messenger 110. Proxy Supernode 120 maintains connections with exit nodes present in geographical proximity. One must understand that there can be multiple instances of Proxy Supernode 120 spread across different geo-locations. Proxy Supernode 120 can dynamically test exit nodes and report metadata of exit nodes to Central Management Unit 122 at a regular time interval.

Central Management Unit 122—a processing unit capable of performing complex functions of receiving metadata of exit nodes in real-time from multiple Proxy Supernodes 120. Additionally, Central Management Unit 122 stores metadata of multiple exit nodes connected with different Proxy Supernodes 120, keeping all metadata in a single storage. Moreover, Central Management Unit 122 can receive requests from Processing Unit 116 and respond to the request by providing the necessary metadata of exit nodes to Processing Unit 116. There is one main Central Management Unit 122 in the current disclosure; however, there can be multiple Central Management Units 112 performing identical functions.

Regional DNS Server 124—a DNS service provider dedicated to resolving DNS queries from exit nodes attempting to connect with Proxy Supernode 120 initially, i.e., for the first time. Regional DNS Server 124 resolves DNS queries from exit nodes by providing the IP address of the Proxy Supernode 120 geographically closest to the requesting exit node. Regional DNS Server 124 is a combination of hardware and software; however, Regional DNS server 124 can be situated on a cloud.

Exit Node 126—an exemplary instance of proxies that used to reach Target 128. In simple terms, Exit Node 126 is the last gateway before the traffic reaches Target 128. Several proxy servers can be used to execute a user's request (e.g. a Proxy Supernode 120 and a Proxy Messenger 110). However, Exit Node 126 is the final proxy that contacts the target and retrieves the information from the target. Exit Node 126 can be, for example, a laptop, a mobile phone, a tablet computer, or smart devices. Further on, Exit Node 126 can also be a device, which is capable of network connectivity, but not primarily intended for networking, such as connected home appliances, smart home security systems, autonomous farming equipment, wearable health monitors, smart factory equipment, wireless inventory trackers, biometric cybersecurity scanners, shipping containers, and others. Additionally, Exit Nodes 126 can be located in different geographical locations.

Target 128—an exemplary instance of a server serving any kind of media content, resources, information, services over the Internet or other network. Target 128 can be, for example, a particular IP address, a domain name, and/or a hostname, possibly with a defined network protocol port, that represents a resource address at a remote system serving the content accessible through industry standard protocols. Target 128 may be a physical or a cloud server that contains the content requested through the target address.

Network 130—is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet. In the current disclosure, the Internet is the most relevant Network for the functioning of the method.

Metadata—a set of information detailing the attributes of an individual Exit Node 126. Attributes of an Exit Node 126 may include but are not limited to: geographical location, IP address, response time/latency, number of hops to reach, battery life, reachability, availability status, ability to reach a specific target, operating platform/system configuration, IP address of a specific Proxy Supernode 120 to which Exit Node 126 is connected. Most of the attributes mentioned above are gathered by Proxy Supernode 120 by testing the Exit Node 126 at regular intervals.

FIG. 1 is an exemplary overall structure showing User Device 102, which can be any computing device (e.g., a personal computer, mobile phone, a tablet computer), DNS Provider 104, Proxy Infrastructure 106, Proxy Supernode 120, Central Management Unit 122, Regional DNS Server 124, Exit Node 126 and Target 128 connecting to Network 130, which can be any digital telecommunications network (e.g., Internet). Proxy Infrastructure 106 contains Proxy Gateway 106, Proxy Messenger 108, User Database 112 and Repository Unit 114. Further on, Repository Unit 114 contains Processing Unit 116 and User Database 118. While the elements shown in the FIG. 1 implement an exemplary embodiment, some elements in other embodiments can have different titles or can be combined into a single element instead of two separate elements (for example Processing Unit 116 and Pool Database 118 can be as a single element. Likewise, Proxy Messenger 110 and Proxy Gateway 108 can be co-located as a single element.) However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure. Moreover, there can be multiple instances of Proxy Infrastructure 106, Proxy Supernode 120, Exit Node 126 situated in different geo-location across the globe; however in FIG. 1, only an instance of the aforementioned elements are shown. Proxy Infrastructure 106, Central Management Unit 122 and Proxy Supernode 120 are the essential elements necessary to provide proxy services to a User Device 102.

Within the Proxy Infrastructure 106, Proxy Gateway 108 and Proxy messenger 110 can communicate with each other, while Proxy Messenger 110 can access User Database 112. Proxy Messenger 110 and Processing unit 116 can communicate with each other, while Processing Unit 116 can access Pool Database 118. Further on, in Proxy Infrastructure 106, Proxy Gateway 108 can communicate with the outside element, namely, the User Device 102. Proxy Messenger 110 can communicate with the outside element, namely, the Proxy Supernode 120. Similarly, the Processing Unit 116 present within the Repository Unit 114 can communicate with the outside element, namely, the Central Management Unit 112.

In FIG. 1, the User Device 102 initially sends a DNS query to the DNS Provider 104 via Network 130. DNS Provider 104 resolves the DNS query by providing the IP address belonging to one of the geographically closest Proxy Infrastructures 106 to the User Device 102. Subsequently, User Device 102 sends the Proxy Infrastructure 106 via Network 130, a request for data extraction from the Target 128. Alternative to the conventional DNS resolution method, DNS Provider 104 can also implement anycast routing method to direct the User Device 102 to one of the geographically closest Proxy Infrastructures 106. Specifically, the request from User Device 102 is received by the Proxy Gateway 108 present in the Proxy Infrastructure 106. Here, one must understand that Proxy Gateway 108 provides an entry point for the User Device 102 into the Proxy Infrastructure 106. Proxy Gateway 108 handles receiving and forwarding the requests and sending back the responses to User Device 102 via Network 130. Additionally, the request from the User Device 102 can contain authentication credentials that are necessary for user validation, and may include user-defined preferences for exit node selection.

Upon receiving the request for data extraction from User Device 102, the Proxy Gateway 108 forwards the request to Proxy Messenger 110. Immediately after receiving the request from Proxy Gateway 108, Proxy Messenger 110 performs user validation by verifying the authentication credentials provided in the request against the User Database 112. Once the credentials are verified, Proxy Messenger 110 checks the request to identify any user-defined preferences that must be satisfied while selecting an exit node. Specifically, Proxy Messenger 110 checks the request for any desired exit node location. If User Device 102 does not provide any user-defined preferences for exit node geo-location, Proxy Messenger 110 requests Repository Unit 114 for metadata of an exit node that is in geographical proximity to the Proxy Infrastructure 106.

The request for metadata from Proxy Messenger 110 is received by the Processing Unit 116 present in the Repository Unit 114. Upon receiving the request for metadata of an exit node, the Processing Unit 116 accesses the Pool Database 118 to identify and select the metadata of an exit node in geographical proximity to the Proxy Infrastructure 106. After which, Processing Unit 116 fetches the metadata of the selected exit node (represented by Exit Node 126) and sends back the metadata to Proxy Messenger 110. The metadata sent by Processing Unit 116 contains the IP address information of the selected exit node and the particular Proxy Supernode 120 to which the selected exit node is connected.

Upon receiving the metadata from Processing Unit 116, Proxy Messenger 110 sends the request for data extraction towards the Proxy Supernode 120 and the IP address of the selected Exit Node 126. After receiving the request from Proxy Messenger 110, the Proxy Supernode 120 instructs Exit Node 126 to establish a connection with the intended Target 128. Correspondingly, Exit Node 126 establishes a connection with Target 128. In the next step, Proxy Supernode 120 sends the request for data extraction to Exit Node 120, which then forwards the request to Target 128.

In another embodiment the User Device 102 can provide the user-defined preferences for exit node geo-location. After checking the request, Proxy Messenger 110 requests Repository Unit 114 for metadata of an exit node situated in the specific geo-location that satisfies the user-defined preferences. The request for metadata from Proxy Messenger 110 is received by the Processing Unit 116 present in the Repository Unit 114. Upon receiving the request for metadata of an exit node, the Processing Unit 116 accesses the Pool Database 118 to identify and select the metadata of an exit node situated in the specific geo-location. After which, Processing Unit 116 fetches the metadata of the selected exit node (also represented by Exit Node 126) and sends back the metadata to Proxy Messenger 110. The metadata sent by Processing Unit 116 contains the IP address information of the selected exit node and the particular Proxy Supernode 120 to which the selected exit node. In this instance, the Proxy Supernode 120 can be situated in geographical proximity to the selected exit node and can be geographically remote from the Proxy Infrastructure 106.

Upon receiving the metadata from Processing Unit 116, Proxy Messenger 110 sends the request for data extraction towards the particular Proxy Supernode 120 and the IP address of the selected Exit Node 126. After receiving the request from Proxy Messenger 110, Proxy Supernode 120 instructs the Exit Node 126 to establish a connection with the intended Target 128. Correspondingly, Exit Node 126 establishes a connection with Target 128. After which, the Proxy Supernode 120 sends the request for data extraction to Exit Node 120, which then forwards the request to Target 128.

Thus, by the above described embodiment, a Proxy Infrastructure 106 that is geographically closer to a User Device 102 can identify, select metadata of exit nodes situated in a remote geo-location from its internal Pool Database 118 through Processing Unit 116. Further, Proxy Infrastructure 106 that is geographically closer to User Device 102, can send the request for data extraction to a particular Proxy Supernode 120 (situated in any remote geo-location) to which the selected exit node is connected.

In another aspect, FIG. 1 shows a communication which occurs when a newly connected Exit Node 126 or multiple Exit Nodes 126 make a DNS query to the Regional DNS Server 124. This connection is done for a purpose to connect exit nodes with the Proxy Supernode 120 that is geographically closer with the exit nodes. The Regional DNS Server 124 resolves the DNS query by providing the IP address of the Proxy Supernode 120 that is in geographical proximity with the requesting Exit Node 126. Alternative to the conventional DNS resolution method, Regional DNS Server 124 can also employ anycast method to direct the Exit Node 126 to the Proxy Supernode 120 that is in geographical proximity with the requesting exit Node 126. Subsequently, Exit Node 126 requests connection towards the Proxy Supernode 120, which in turn confirms the connections, thereby establishing a connection with Exit node 126. One must understand here that Proxy Supernode 120 can accept and maintain connections with multiple instances of exit nodes that are in geographical proximity. After establishing connections, Proxy Supernode 120 regularly tests Exit Node 126 or multiple Exit Nodes 126 to gather information regarding several attributes of Exit Node 126 or multiple Exit Nodes 126. Proxy Supernode 120 reports the gathered information regarding the Exit Node 126 or multiple Exit Nodes 126 to Central Management Unit 122 on a regular basis. Also, Proxy Supernode 120 can report to Central Management Unit 122 about newly connected exit nodes or disconnections of previously connected exit nodes.

In yet another aspect, FIG. 1 presents that the Proxy Infrastructure 106 regularly gathers metadata of multiple exit nodes from Central Management Unit 122 via Network 130. Specifically, Processing Unit 116 accesses the Central Management Unit 122 to gather metadata of multiple exit nodes, irrespective of exit nodes' locations. Processing Unit 116 classifies the metadata of multiple exit nodes into several categories based on exit nodes' attributes, including but not limited to geo-location, ability to reach specific targets, latency/response time. Processing Unit 116 stores the classified metadata in Pool Database 118. Moreover, Processing Unit 116 can continuously update the metadata of exit nodes by making necessary amendments to the Pool Database 118.

Additionally, in another aspect, FIG. 1 employs one of the efficient TCP congestion control algorithms (such as the BBR) which greatly reduces latency and improves network throughput. BBR stands for Bandwidth Bottleneck and Round trip time. In the current embodiment, BBR algorithm optimizes how network packets are transferred in the TCP connection. More specifically, the BBR algorithm can control the amount of data and data transmission speed in TCP connections. In the current embodiment, BBR enables the transmission or in other words distribution of more data in less time without packet losses, thus resulting in optimum network throughput and minimized latency. Unlike other TCP congestion control algorithms which do not detect congestion when they occur, BBR prevents network congestion before they occur.

Figure 2A:
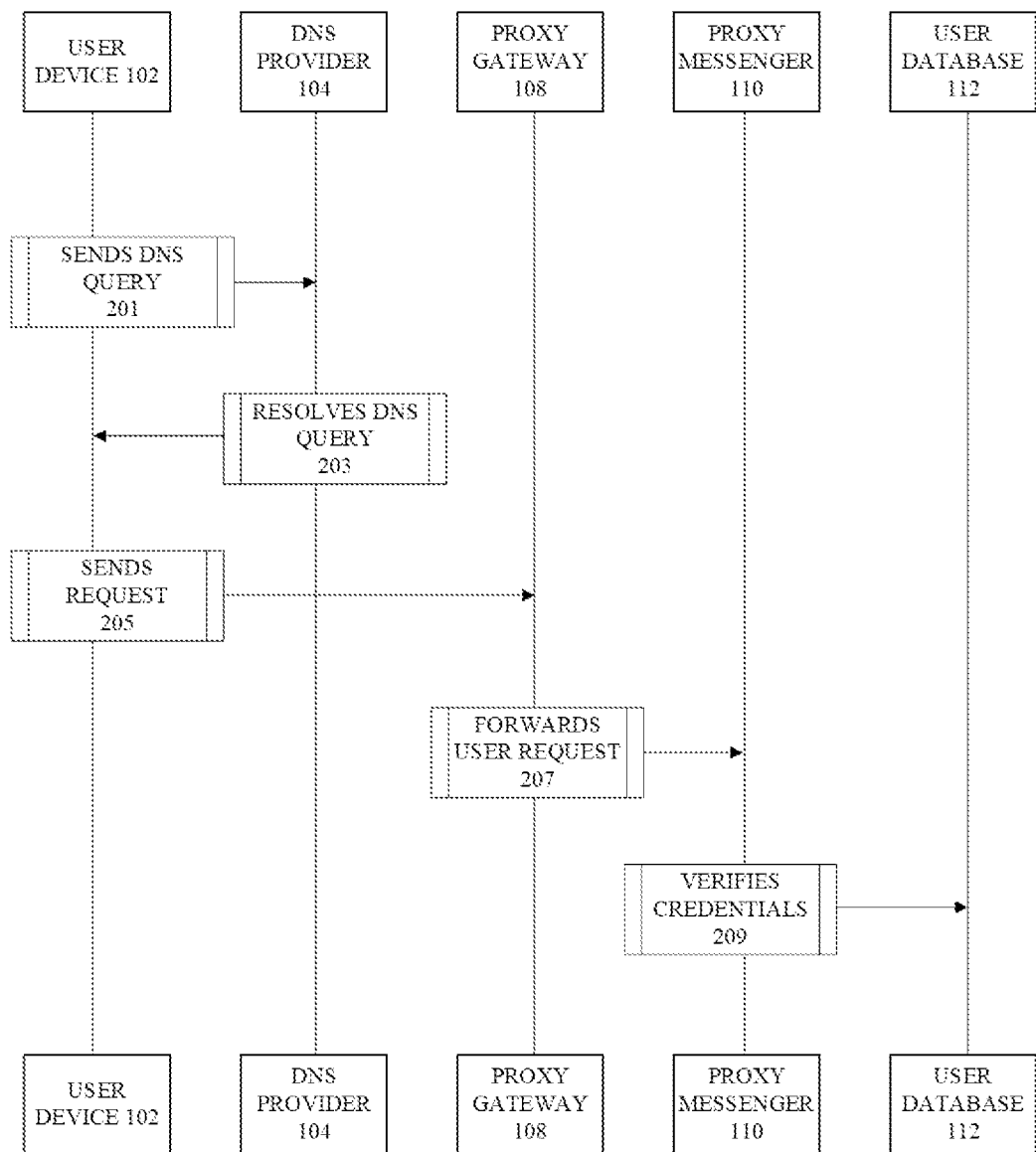
FIGS. 2A through 2D show an exemplary flow diagram of a user device sending a request to a target through a geographically closest proxy infrastructure.

FIG. 2A represents an exemplary flow diagram showing User Device 102, sending a request to Target 128 through the geographically closest Proxy Infrastructure 106 (not shown). In step 201, User Device 102 begins by sending a DNS query to DNS Provider 104 via Network 130 to obtain the IP address of the Proxy Infrastructure 106 and, in general, access the proxy services provided by the Proxy Infrastructure 106.

In step 203, after receiving the DNS query form User Device 102, the DNS Provider 104 resolves the DNS query by providing the IP address of the Proxy Infrastructure 106 that is geographically closest to the User Device 102. As mentioned previously, DNS Provider 104 responds to the DNS queries based on the geographical location of both User Device 102 and Proxy Infrastructure 106 to which the User Device 104 is attempting to connect. For instance, DNS Provider 104 ensures that a User Device 102 located in Canada is provided with the IP address of Proxy Infrastructure 106 that is geographically closest to that particular User Device 102 located in Canada.

In step 205, after receiving the IP address of the geographically closest Proxy Infrastructure 106, User Device 102 sends a request for data extraction from Target 128 to Proxy Infrastructure 106. More specifically, the request is sent to Proxy Gateway 108, present within the Proxy Infrastructure 106 in this exemplary embodiment. One must recall here that Proxy Gateway 108 is an entry point for User Device 102 into Proxy Infrastructure 106. The request sent by the User Device contains authentication credentials necessary for user validation. Credentials can include but are not limited to usernames, passwords, hash identifications, serial numbers, PIN. Moreover, the request can be sent on any standard network protocols, including but are not limited to HTTP, UDP, SOCKS5. It is important to note that the request sent by User Device 102 can contain user-defined preferences for exit node selection, for instance, a desired exit node location.

In step 207, after receiving the request from User Device 102, Proxy Gateway 108 forwards the request to Proxy Messenger 110, present within the Proxy Infrastructure 106 in this exemplary embodiment. Consequently, in step 209, upon receiving the request, Proxy Messenger 110 verifies the credentials contained in the request. Specifically, Proxy messenger 110 accesses User Database 112 and verifies the credentials against the data present in User Database 112. Through verifying the credentials, Proxy Messenger 110 validates the user. The validation process may involve but is not limited to verifying the combination of the user ID and password or PIN provided by User Device 102. Verifying the credentials is essential because it enables Proxy Infrastructure 106 to keep its networks secure by permitting only validated User Devices 102 to access its secured services.

Figure 2B:
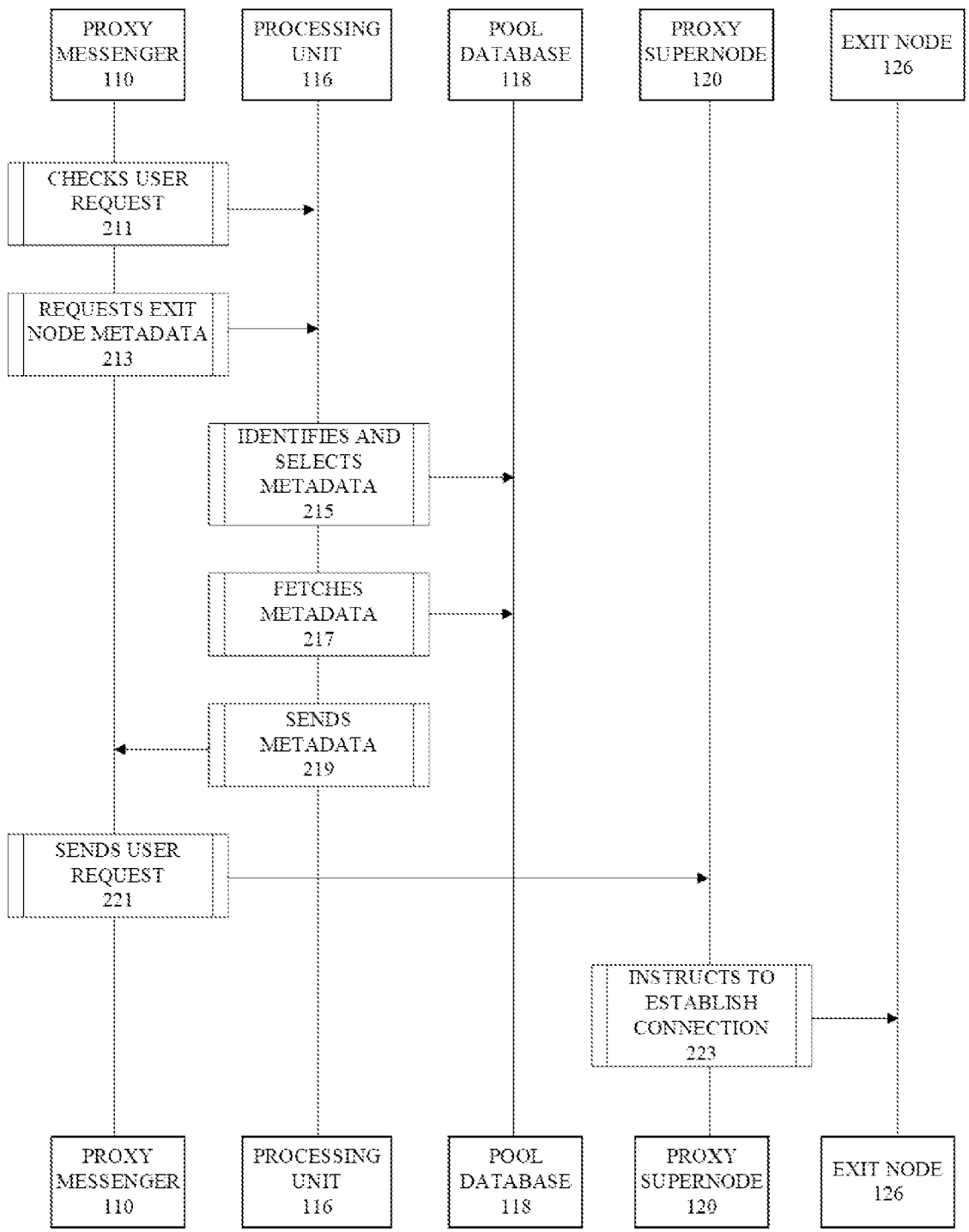

FIG. 2B is the continuation of an exemplary flow diagram of FIG. 2A. In step 211, after verifying the credentials and user validation, Proxy Messenger 110 checks the request to identify any user-defined preferences that must be satisfied while selecting an Exit Node 126. Specifically, Proxy Messenger 110 checks the request for any desired exit node location. If the request does not contain any user-defined preferences for Exit Node 126 geo-location, in that case, Proxy Messenger 110 requests Processing Unit 116 present within the Repository Unit 114 (not shown) for metadata of an Exit Node 126 that is in geographical proximity to the Proxy Infrastructure 106. Correspondingly, in step 213, Proxy Messenger 110 requests the Processing Unit 116 present within the Repository Unit for metadata of an Exit Node 126 in geographical proximity to the Proxy Infrastructure 106.

In step 215, after receiving the request for metadata from Proxy Messenger 110, Processing Unit 116 identifies and selects the metadata of Exit Node 126 that is in geographical proximity with Proxy Infrastructure 106 by accessing Pool Database 118. Consequently, in step 217, Processing unit 116 fetches the metadata of the selected Exit Node 126 from Pool Database 118. In step 219, Processing Unit 116 sends the metadata of the selected Exit Node 126 to Proxy Messenger 110. The metadata sent by Processing Unit 116 contains the IP address information of the selected exit node and the particular Proxy Supernode 120 to which the selected exit node is connected.

In step 221, after receiving the metadata of the selected Exit Node 126, Proxy Messenger 110 sends the request for data extraction to Proxy Supernode 120 and the IP address of the selected Exit Node 126. Before sending the request for data extraction to Proxy Supernode 120, Proxy Messenger 110 can implement the chunked transfer encoding method over the request in case of HTTP communication. Chunked transfer encoding is a feature of HTTP and is a type of data transfer mechanism. In chunked transfer encoding, the data stream is divided into a series of non-overlapping "chunks". The chunks are sent out and received independently of one another. No knowledge of the data stream outside the currently-being processed chunk is necessary for both parties involved in data transfer at any given time. Chunked transfer encoding allows Proxy Messenger 110 to maintain a persistent connection to transfer dynamically generated content. Moreover, chunked transfer encoding allows Poxy messenger 110 to send large amounts of data and optimize data transmission. Additionally, persistent connection achieved through chunking aids in avoiding latency problems as it eliminates the overheads of creating a new connection for every transaction. In networking terms, overhead refers to any combination of excess or indirect computation time, memory, bandwidth, or other required resources to perform a specific task.

Next, in step 223, after receiving the request for data extraction and the IP address of the selected Exit Node 126, Proxy Supernode 120 instructs Exit Node 126 to establish a connection to the Target 128.

Figure 2C:
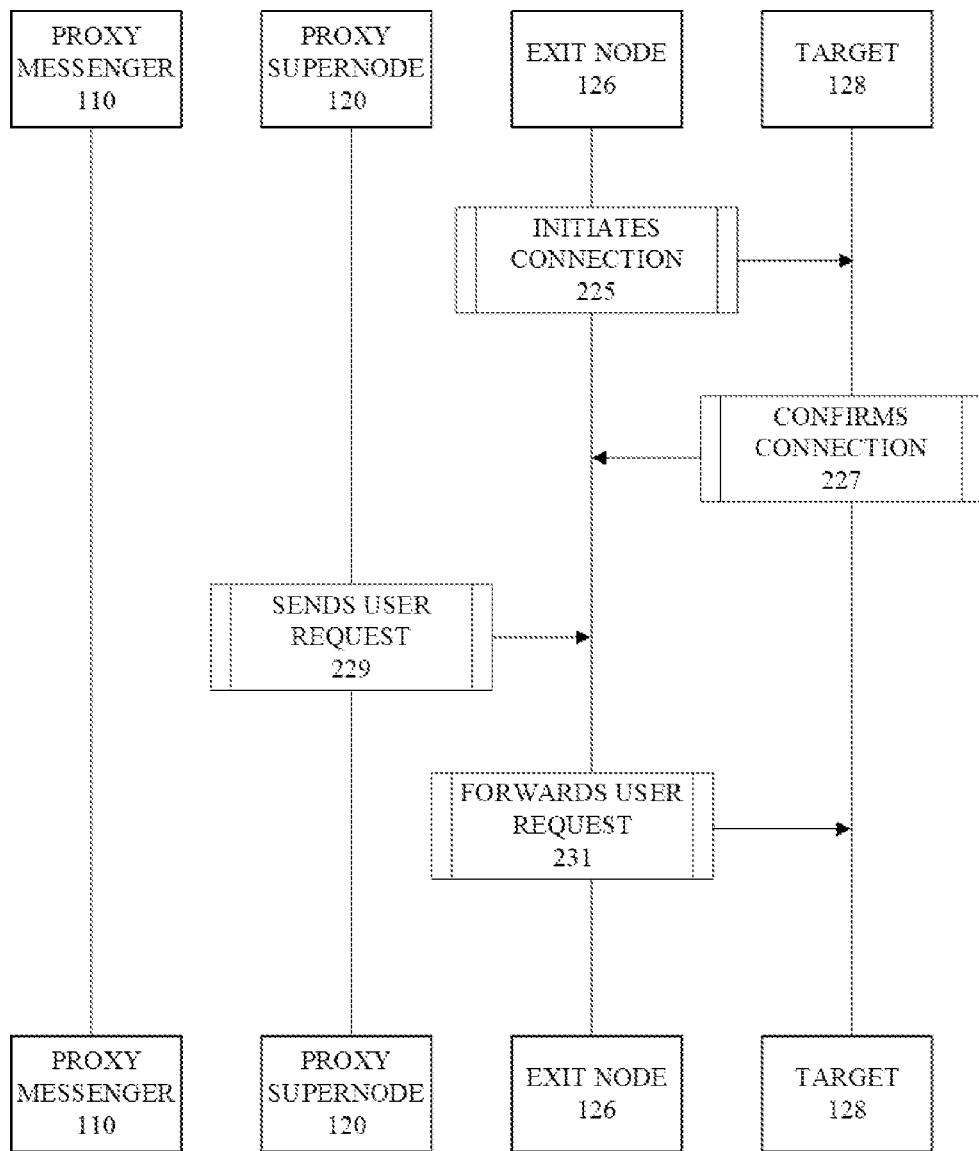

FIG. 2C is the continuation of an exemplary flow diagram of FIGS. 2A and 2B. In step 225, Exit Node 126 initiates the connection with Target 128 and subsequently, in step 227, Target 128 confirms the connection with Exit Node 126, thereby establishing the connection between Exit Node 126 and Target 128. The connection between Exit Node 126 and Target 128 can occur over any of the standard communication protocols, including but not limited to TCP/IP, UDP, SOCKS5. Therefore, steps 225 and 227 can include all necessary steps required for establishing a connection based on the aforementioned protocols.

In step 229, after Exit Node 126 establishes the connection with Target 128, Proxy Supernode 120 sends the request for data extraction to Exit Node 126 which in step 231, forwards the request to Target 128.

Figure 2D:
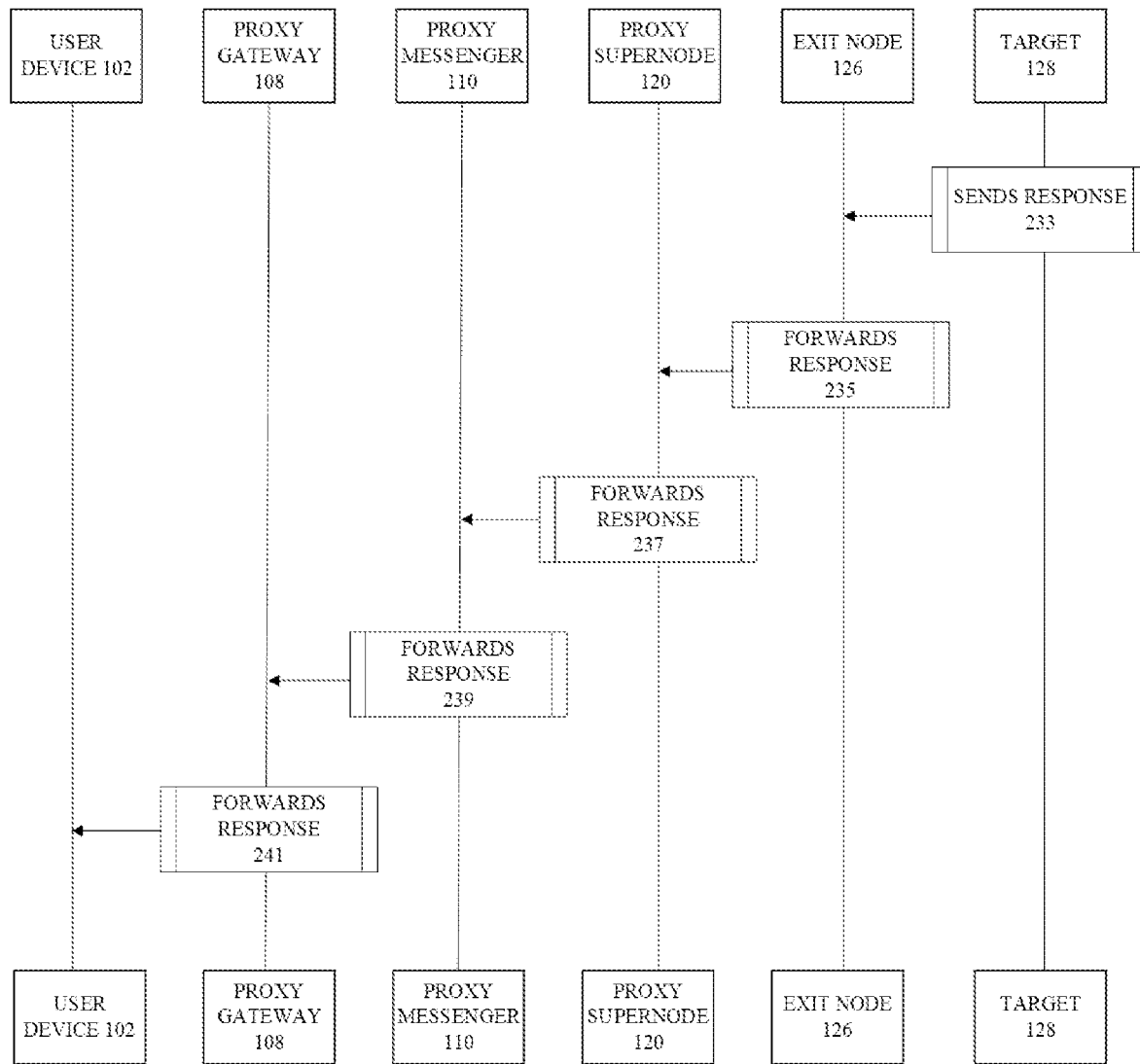

FIG. 2D is the continuation of an exemplary flow diagram of FIGS. 2A, 2B, and 2C. In step 233, Target 128 sends the relevant response to the request forwarded by Exit Node 126, and in step 235, Exit Node 126 forwards the response from Target 128 to the Proxy Supernode 120. It is important to mention here that Exit Node 126 can implement a chunked encoding transfer method over the received response in case of an HTTP communication. In step 237, after receiving the response from the Exit Node 126, Proxy Supernode 120 forwards the response to Proxy Messenger 110 present within the Proxy Infrastructure in this exemplary embodiment. In step 239, Proxy Messenger 110 forwards the response to Proxy Gateway 108, which then, in step 241, forwards the response to the User Device 102.

As mentioned earlier, the request from User Device 102 can contain user-defined preferences for exit node selection, especially for exit node geo-location. Therefore, if the request sent by User Device 102 to Proxy Gateway 108 present within the Proxy Infrastructure 106 in step 205 contains the user-defined preferences for exit node geo-location. In that case, steps 207, 209, 211 remain unchanged; however, in step 213, Proxy Messenger 110 requests Processing Unit 116 present within the Repository unit 114 for metadata of an Exit Node 126 situated in the specific geo-location that satisfies the user-defined preferences. Consecutively, in step 215, after receiving the request for metadata from Proxy Messenger 110, Processing Unit 116 identifies and selects the metadata of Exit Node 126 situated in a specific geo-location that satisfies the user-defined preferences by accessing the Pool Database 118. Subsequently, in step 217, Processing unit 116 fetches the metadata of the selected Exit Node 126 from Pool Database 118. After which, the successive steps from 219 to 239 remain unchanged.

Figure 3A:
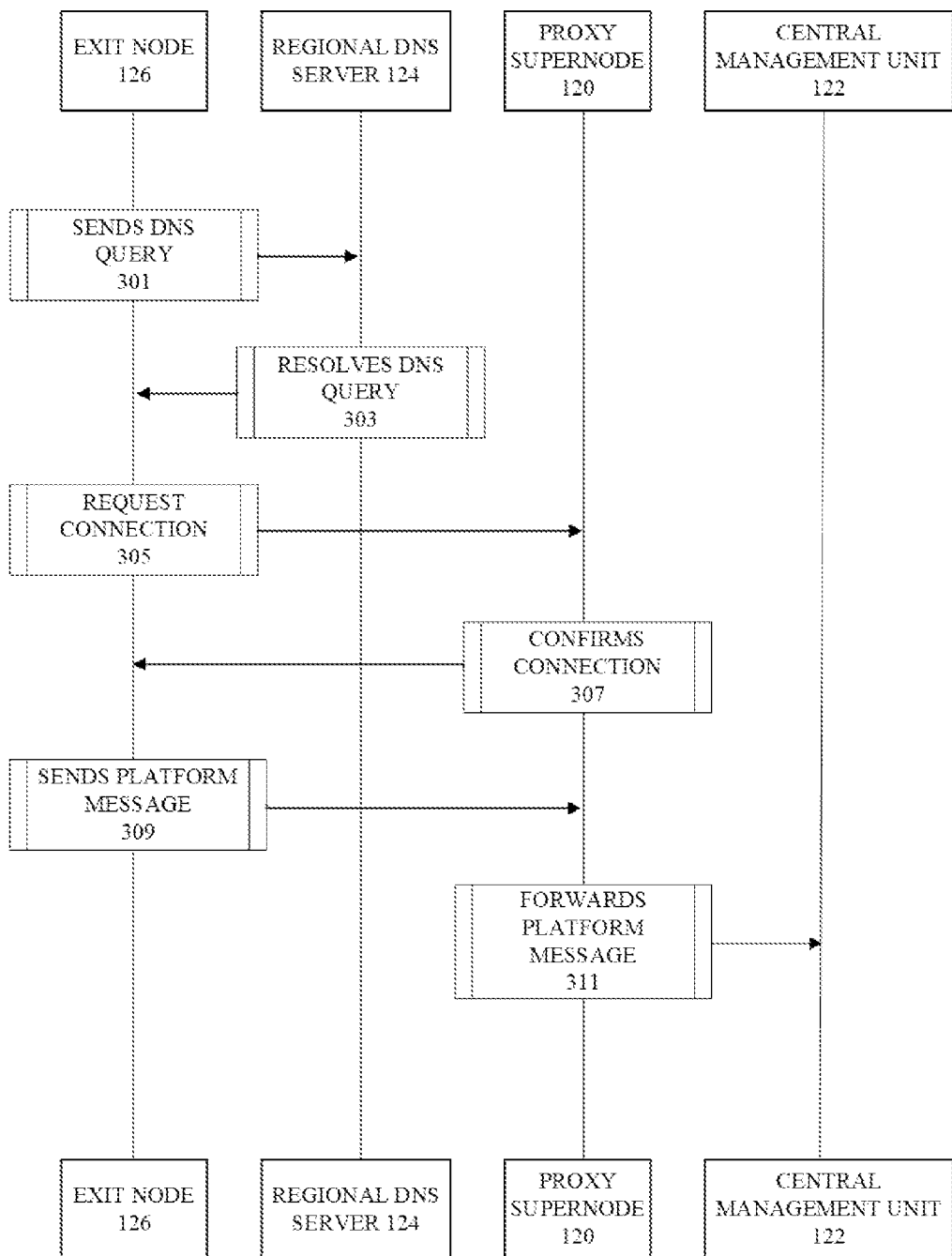
FIGS. 3A and 3B show an exemplary flow diagram of a proxy supernode reporting relevant information regarding an exit node to a central management unit.

FIG. 3A is an exemplary flow diagram showing Proxy Supernode 120 reporting relevant information of Exit Node 126 to Central Management Unit 122. In step 301, Exit node 126 initially sends a DNS query to Regional DNS Server 124 requesting the IP address of Proxy Supernode 120. In step 303, Regional DNS Server 124 resolves the DNS query by providing the IP address of the Proxy Supernode 120 that is in within geographical proximity with the Exit Node 126.

In step 305, after receiving the IP address of the Proxy Supernode 120 that is geographical proximity, Exit Node 126 requests for connection with Proxy Supernode 120. In step 307, Proxy Supernode 120 responds by confirming the connection, thereby establishing the connection with Exit Node 126. In step 309, after establishing the connection, Exit Node 126 sends a platform message to Proxy Supernode 120. The platform message can include information such as but not limited to operating system configuration, hardware IDs, serial numbers, computer hardware IDs (CHID), universally unique identifiers, and information on battery level. Consecutively, in step 311, Proxy Supernode 120 receives the platform message from Exit Node 126 and forwards it to Central Management Unit 122 thereby reporting the newly connected Exit node 126. The connection between Exit Node 126 and Proxy Supernode 120 can occur over any of the standard communication protocols, including but not limited to TCP/IP, UDP, SOCKS5. Therefore, steps 305 and 307 can include all necessary steps required for establishing a connection based on the aforementioned protocols.

Figure 3B:
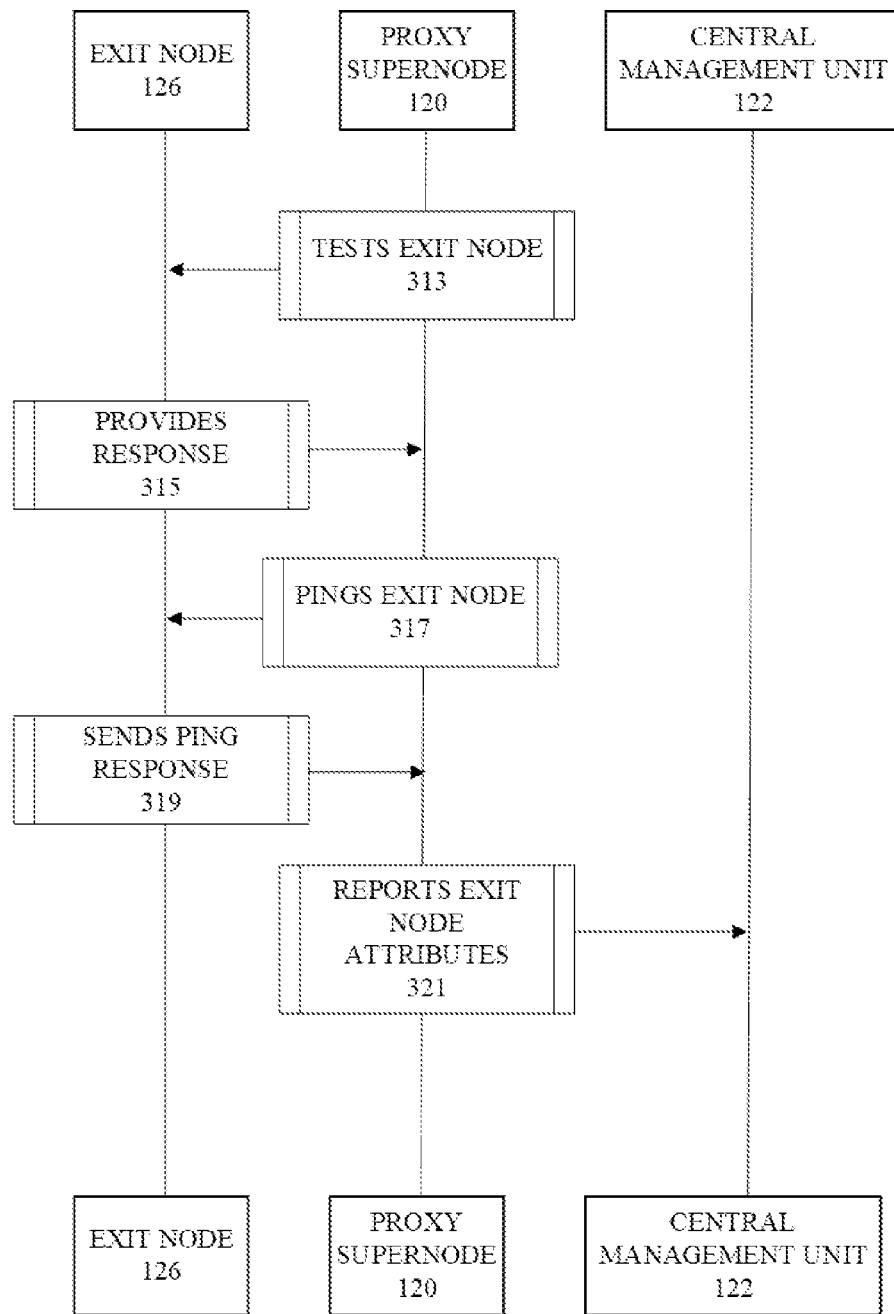

FIG. 3B is the continuation of an exemplary flow diagram of FIG. 3A. In step 313, Proxy Supernode 120 proceeds to test Exit Node 126. Proxy Supernode 120 can test Exit Node 126 by sending a benchmark HTTP request. The benchmark HTTP request can be a request to reach any specific target via Network 130 (not shown) (e.g., an IP address, a hostname), and is decided and initiated by Proxy Supernode 120 dynamically. Benchmark HTTP requests are sent by Proxy Supernode 120 to gather and analyze several attributes of Exit Node 126 such as, for example, latency, ability to reach specific targets, availability status.

In step 315, Exit Node 126 responds to the tests carried out by Proxy supernode 120. In case of HTTP benchmark request, Exit Node 126 responds to the benchmark HTTP request by retrieving the necessary data from a specific target (as mentioned in the benchmark HTTP request) and sending it back to Proxy Supernode 120. Testing of Exit Node 126 by sending benchmark HTTP requests can provide information on attributes of Exit Node 126 such as response time/latency, ability to reach specific targets (e.g., streaming sites, electronic retail sites), availability status.

In step 317, Proxy Supernode 120 proceeds to send a ping test to Exit Node 126. More specifically, Proxy Supernode 120 sends a ping message to Exit Node 126. In networking, a ping test is a network utility tool to assess a particular host; in this exemplary embodiment, it is Exit Node 126. Additionally, the ping test aids Proxy Supernode 120 gather information regarding the number of hops between Proxy Supernode 120 and Exit Node 126. The ping test can also provide information about connectivity and response time between Proxy Supernode 120 and Exit Node 126. The ping message sent by Proxy Supernode 120 uses the Internet Control Message Protocol (ICMP) data packet. Here, ICMP refers to one of the supporting protocols within the Internet Protocol (IP) and is used to send messages and operational information between network devices. However, ICMP is not typically used in regular data communication; ICMP is instead used as a diagnostic tool. In this exemplary embodiment, the ICMP ping message can contain up to 64 data bytes and 8 bytes of protocol reader information.

In step 319, Exit Node 126 immediately responds to the ping message. In a ping test, the response is often termed as the pong message. The response simply will echo back the ping message that was sent by Proxy Supernode 120. The response message, which is termed as pong, uses ICMP packets to echo back the reply. It must be noted that Proxy Supernode 120 continues to test and send ping messages at a regular interval in order to gather information about attributes of Exit Node 126, which include but are not limited to response time/latency, ability to reach specific targets, number of hops, availability status. The collective information about several attributes of Exit Node 126 is referred to as the metadata. Consecutively, after testing, in step 321, Proxy Supernode 120 reports the gathered information about several attributes of Exit Node 126 to Central Management Unit 122.

Figure 4:
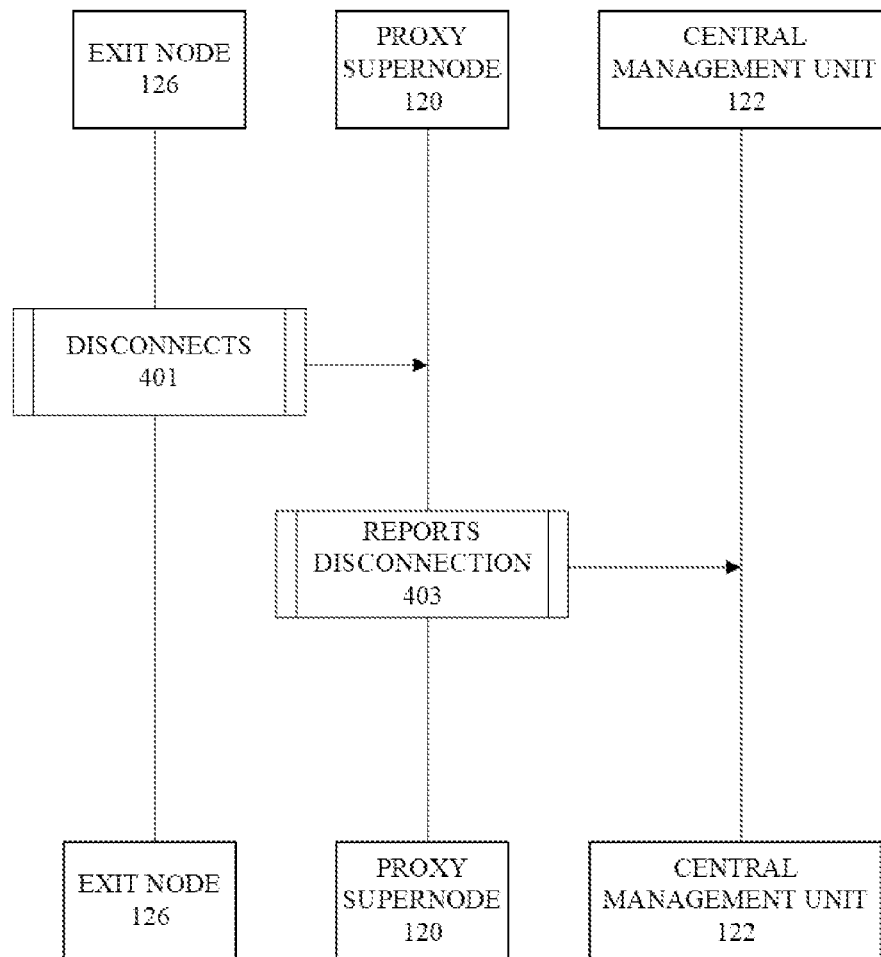
FIG. 4 is an exemplary flow diagram showing a proxy supernode reporting disconnection of an exit node to a central management unit.

FIG. 4 is an exemplary flow diagram showing Proxy Supernode 120 reporting the disconnection of Exit Node 126, from said Proxy Supernode 120, to Central management Unit 122. Exit Node 126 can disconnect from Proxy supernode 120 for many reasons, such as, for example, low battery level, system failure. Therefore, in step 401, Exit Node 126 disconnects from Proxy Supernode 120, thereby terminating the communication with Proxy Supernode 126. Consecutively, in step 403, Proxy Supernode 120 reports the disconnection of Exit Node 126 to Central Management Unit 122.

Figure 5:
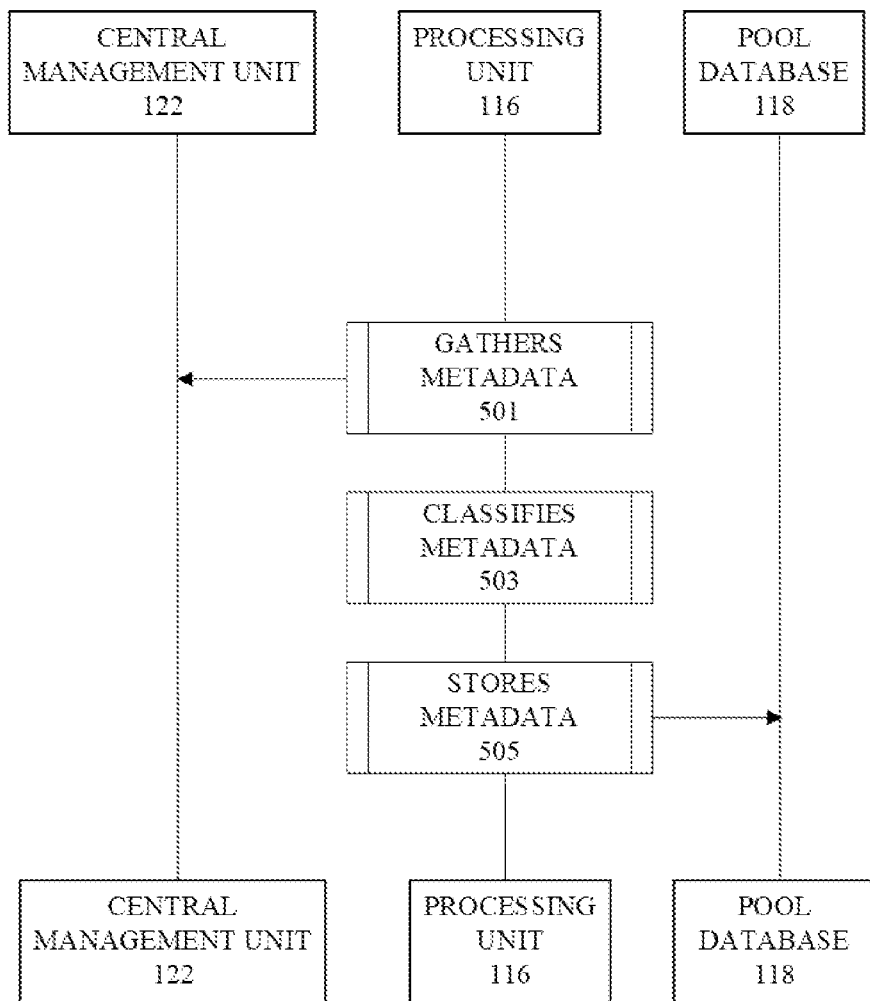
FIG. 5 is an exemplary flow diagram showing a repository unit collecting metadata from a central management unit.

FIG. 5 is an exemplary flow diagram showing the collection of metadata form Central Management Unit 122. In step 501, Processing Unit 116, is shown in this exemplary embodiment as being present within Repository Unit 114, accesses and gathers metadata from Central Management Unit 122. Central Management Unit 122 provides metadata of multiple Exit Nodes 126 to Processing Unit 116. One must recall here that metadata refers to information on several attributes of an Exit Node 126, such as response time, the number of hops, reachability, availability status, ability to reach specific targets, IP address, and geographical location. In step 503, Processing Unit 116 classifies the gathered metadata into categories based on several attributes of Exit Nodes 126 such as for example response, ability to reach specific targets, location, IP address.

In step 505, Processing unit 116 stores the classified metadata of Exit Nodes 126 in Pool Database 118. If there are changes to the metadata, (e.g., if an Exit Node 126 is disconnected or latency increases), Processing Unit 116 makes necessary amendments to Pool Database 118. Processing Unit 116 can remove the metadata of an Exit Node 126 or multiple Exit Nodes 126 from Pool Database 118. It must be mentioned here that Processing Unit 116 can access and gather metadata of exit Nodes 126 from Central Management Unit 122 multiple times regularly. Moreover, Processing Unit 116 can make necessary amendments to Pool Database 118, thereby updating the metadata in Pool Database 118.

Figure 6:
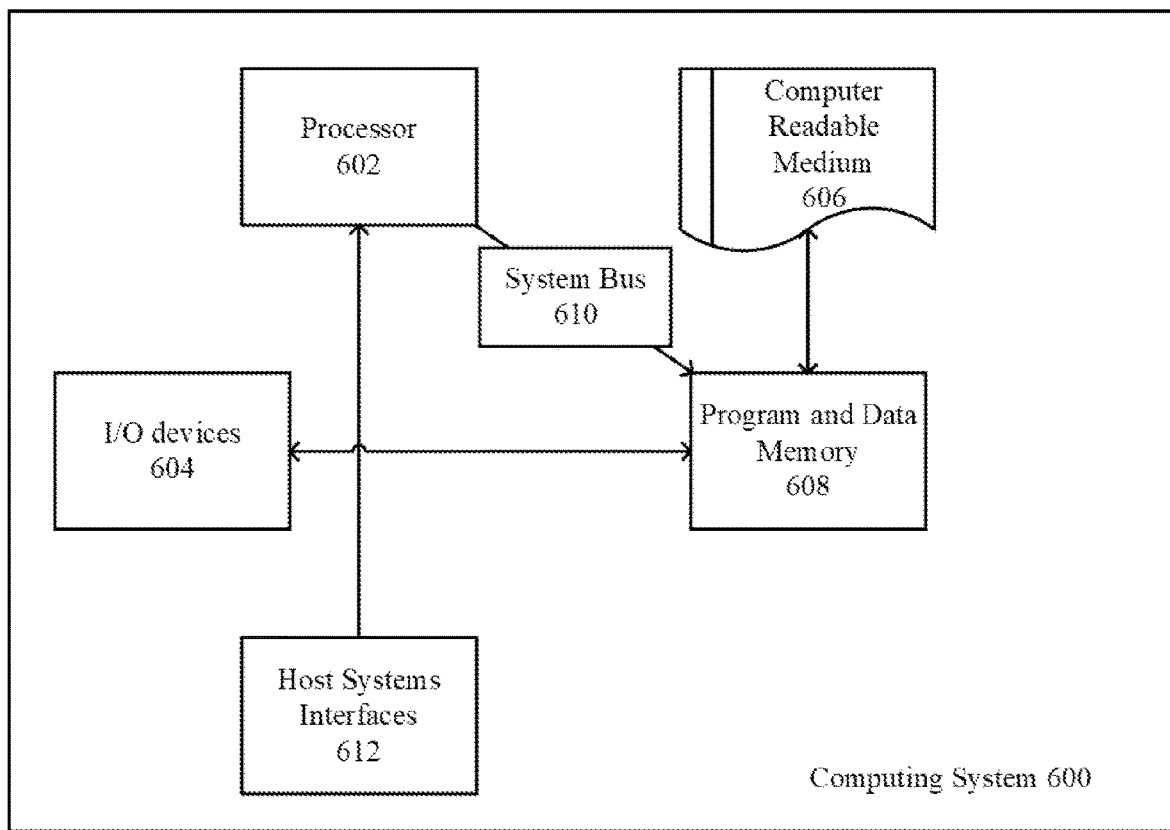
FIG. 6 shows a computing system in which a computer readable medium may provide instructions for performing any of the methods and processes disclosed herein.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 6 illustrates a computing system 600 in which a computer-readable medium 606 may provide instructions for performing any of the methods and processes disclosed herein.

Furthermore, some aspects of the embodiments herein can take the form of a computer program product accessible from the computer-readable medium 606 to provide program code for use by or in connection with a computer or any instruction execution system. For the purposes of this description, the computer-readable medium 606 can be any apparatus that can tangibly store the program code for use by or in connection with the instruction execution system, apparatus, or device, including the computing system 600.

The computer-readable medium 606 can be any tangible electronic, magnetic, optical, electromagnetic, infrared, or semiconductor system (or apparatus or device). Some examples of a computer-readable medium 606 include solid-state memories, magnetic tapes, removable computer diskettes, random access memories (RAM), read-only memories (ROM), magnetic disks, and optical disks. Some examples of optical disks include read-only compact disks (CD-ROM), read/write compact disks (CD-R/W), and digital versatile disks (DVD).

The computing system 600 can include one or more processors 602 coupled directly or indirectly to memory 608 through a system bus 610. The memory 608 can include local memory employed during actual execution of the program code, bulk storage, and/or cache memories, which provide temporary storage of at least some of the program code in order to reduce the number of times the code is retrieved from bulk storage during execution.

Input/output (I/O) devices 604 (including but not limited to keyboards, displays, pointing devices, I/O interfaces, etc.) can be coupled to the computing system 600 either directly or through intervening I/O controllers. Network adapters may also be coupled to the computing system 600 to enable the computing system 600 to couple to other data processing systems, such as through host systems interfaces 612, printers, and/or storage devices through intervening private or public networks. Modems, cable modems, and Ethernet cards are just examples of network adapter types.

The disclosure presents a method and system for data extraction and gathering from a web server using the nearest available proxy server comprising: receiving, by a proxy gateway at a proxy infrastructure geographically closest to a user device, a user request; forwarding, by the proxy gateway at the proxy infrastructure, the user request to a proxy messenger; checking, by the proxy messenger at the proxy infrastructure, the user request for geolocation of an exit node; requesting, by the proxy messenger at the proxy infrastructure, from a repository unit, the metadata of the exit node to implement the user request; selecting, by the repository unit at the proxy infrastructure from a pool database, the exit node to implement the user request; sending, by the proxy messenger at the proxy infrastructure, the user request and an Internet Protocol (IP) address of the exit node selected to a proxy supernode; instructing, by the proxy supernode, the exit node selected to establish a connection with a target; sending, by the proxy supernode, the user request to the exit node selected; forwarding, by the exit node selected, the user request to the target.

In the method presented a content for the user request is returned to a User device from the target by: receiving, by the exit node selected, the response for the user request from the target; forwarding, by the exit node selected, the response received from the target to the proxy supernode; forwarding, by the proxy supernode, the response received from the target to the proxy messenger; forwarding, by the proxy messenger, the response received from the target to the proxy gateway; forwarding, by the proxy gateway, the response received from the target to the user device.

The repository unit at the proxy infrastructure gathers from a central management unit the metadata of multiple exit nodes irrespective of their locations. The exit nodes in the pool database are classified into categories based on exit node attributes, comprising: geo-location, ability to reach specific targets, or latency/response time. The proxy supernode maintains connection with multiple exit nodes in geographical proximity and the exit nodes connect to the proxy supernode by making a Domain Name System (DNS) query to a regional DNS server.

In the method disclosed, before accepting the user request, the proxy messenger at the proxy infrastructure, performs user validation actions including checking data about a user in a user database. The request from the user device contains authentication credentials necessary for user validation.

In the method, the user device connects to the geographically closest proxy infrastructure by requesting from the DNS provider an Internet Protocol (IP) address of the geographically closest proxy infrastructure. The user request contains user-defined preferences comprising: geographical location of the exit node, ability to reach specific target, operating system platform or system configuration settings.

In the method the proxy messenger requests from the repository unit the metadata of an exit node to implement the user request in the closest geographical proximity to the proxy infrastructure, wherein the user request lacks geolocation and wherein the repository unit identifies, selects and submits to the proxy messenger the metadata of the exit node according to the proxy messenger requirements.

In another embodiment, the proxy messenger requests from the repository unit the metadata of an exit node to implement the user request in the closest geographical proximity to the target and wherein the repository unit identifies and selects the metadata of an exit node situated closest to the target, wherein the geo-location of the target is deduced from the parameters of the user request.

In another embodiment, the proxy messenger requests from the repository unit the metadata of an exit node to implement the user request wherein the user request indicates the specific exit node geolocation and wherein the repository unit identifies, selects and submits to the proxy messenger the metadata of the exit node according to the proxy messenger requirements that satisfies user-defined preferences.

The method of claim 1 wherein metadata of the exit node sent by the repository unit contains IP address information of the exit node selected and the proxy supernode to which the exit node selected is connected. The proxy supernode reports gathered information regarding the exit node to a central management unit on a regular basis. The exit node is connected to the proxy supernode geographically closest to the exit node.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or elements of any or all the claims. The invention(s) is/are defined through the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment.

The invention claimed is:

1. A computer-readable storage medium for data extraction and gathering from a web server using a nearest available proxy server comprising instructions which, when executed by a computer device, causes the computer device to:
receive a user request by a proxy gateway at a proxy infrastructure geographically closest to a user device;
forward the user request to a proxy messenger;
check the user request for geolocation of an exit node;
request, from a repository unit, metadata of the exit node to implement the user request;
select the exit node to implement the user request from a pool database;
send the user request and an Internet Protocol (IP) address of the exit node selected to a proxy supernode;
instruct the exit node selected to establish a connection with a target;
send the user request to the exit node selected;
forward the user request to the target.

2. The computer-readable storage medium of claim 1, wherein content for the user request is returned to the user device from the target by:
receiving the response for the user request from the target;
forwarding the response received from the target to the proxy supernode, the proxy messenger, the proxy gateway, and to the user device.

3. The computer-readable storage medium of claim 1, wherein the repository unit at the proxy infrastructure gathers from a central management unit the metadata of multiple exit nodes irrespective of their locations.

4. The computer-readable storage medium of claim 1, wherein exit nodes in the pool database are classified into categories based on exit node attributes, comprising: geo-location, ability to reach specific targets, or latency/response time.

5. The computer-readable storage medium of claim 1, wherein the proxy supernode maintains connection with multiple exit nodes in geographical proximity.

6. The computer-readable storage medium of claim 5 wherein the exit node connects to the proxy supernode by making a Domain Name System (DNS) query to a regional DNS server.

7. The computer-readable storage medium of claim 1 wherein, before accepting the user request, the proxy messenger at the proxy infrastructure, performs user validation actions including checking data about a user in a user database.

8. The computer-readable storage medium of claim 7 wherein the request from the user device contains authentication credentials necessary for user validation.

9. The computer-readable storage medium of claim 1 wherein the user device connects to the geographically closest proxy infrastructure by requesting from the DNS provider the IP address of the geographically closest proxy infrastructure.

10. The computer-readable storage medium of claim 1 wherein the user request contains user-defined preferences comprising: geographical location of the exit node, ability to reach specific target, operating system platform or system configuration settings.

11. A system for data extraction and gathering from a web server using a nearest available proxy server comprising:
- at least one processor;
- a memory coupled to the at least one processor;
- a proxy infrastructure geographically closest to a user device configured to:
  - receive a user request by a proxy gateway at a proxy infrastructure geographically closest to a user device;
  - forward the user request to a proxy messenger;
  - check the user request for geolocation of an exit node;
  - request, from a repository unit, metadata of the exit node to implement the user request;
  - select the exit node to implement the user request from a pool database;
  - send the user request and an Internet Protocol (IP) address of the exit node selected to a proxy supernode;
  - instruct the exit node selected to establish a connection with a target;
  - send the user request to the exit node selected;
  - forward the user request to the target.

12. The system of claim 11, wherein content for the user request is returned to a user device from the target by:
- receiving the response for the user request from the target;
- forwarding the response received from the target to the proxy supernode, the proxy messenger, the proxy gateway, and to the user device.

13. The system of claim 11, wherein the repository unit at the proxy infrastructure gathers from a central management unit the metadata of multiple exit nodes irrespective of their locations.

14. The system of claim 11, wherein exit nodes in the pool database are classified into categories based on exit node attributes, comprising: geo-location, ability to reach specific targets, or latency/response time.

15. The system of claim 11, wherein the proxy supernode maintains connection with multiple exit nodes in geographical proximity.

16. The system of claim 15 wherein the exit node connects to the proxy supernode by making a Domain Name System (DNS) query to a regional DNS server.

17. The system of claim 16 wherein the exit node, upon connecting to the proxy supernode, sends a platform message to the proxy supernode.

18. The system of claim 17 wherein the proxy supernode upon receiving the platform message from the exit node, forwards the platform message to a central management unit.

19. The system of claim 17 wherein the platform message comprises at least one, or a combination, of: operating system configuration details, hardware IDs, serial numbers, computer hardware IDs (CHID), universally unique identifiers, or information regarding battery level.

20. The system of claim 11 wherein, before accepting the user request, the proxy messenger at the proxy infrastructure, performs user validation actions including checking data about a user in a user database.

21. The system of claim 20 wherein the request from the user device contains authentication credentials necessary for user validation.

22. The system of claim 11 wherein the user device connects to the geographically closest proxy infrastructure by requesting from the DNS provider the IP address of the geographically closest proxy infrastructure.

23. The system of claim 11 wherein the user request contains user-defined preferences comprising: geographical location of the exit node, ability to reach specific target, operating system platform or system configuration settings.

* * * * *